US012499129B1

(12) United States Patent
Josipovic et al.

(10) Patent No.: US 12,499,129 B1
(45) Date of Patent: Dec. 16, 2025

(54) EXECUTING WORKBOOK CODE WITHIN A CLOUD-BASED DATA WAREHOUSE

(71) Applicant: SIGMA COMPUTING, INC., San Francisco, CA (US)

(72) Inventors: Stipo Josipovic, San Francisco, CA (US); Gregory G. Owen, San Mateo, CA (US); Neil F. Lugovoy, Los Gatos, CA (US); Kenneth Truong, Temple City, CA (US); Donald Huang, San Francisco, CA (US); James L. Gale, San Francisco, CA (US); Joseph M. Hain, Benicia, CA (US); Siyuan Fan, San Francisco, CA (US)

(73) Assignee: SIGMA COMPUTING, INC., San Francisco, CA (US)

(*) Notice: Subject to any disclaimer, the term of this patent is extended or adjusted under 35 U.S.C. 154(b) by 0 days.

(21) Appl. No.: 18/624,464

(22) Filed: Apr. 2, 2024

(51) Int. Cl.
G06F 9/455 (2018.01)
G06F 16/242 (2019.01)
G06F 16/28 (2019.01)

(52) U.S. Cl.
CPC ........ G06F 16/283 (2019.01); G06F 9/45504 (2013.01); G06F 16/2433 (2019.01)

(58) Field of Classification Search
CPC . G06F 16/283; G06F 9/45504; G06F 16/2433
See application file for complete search history.

(56) References Cited

U.S. PATENT DOCUMENTS

| | | | | |
|---|---|---|---|---|
| 8,793,213 B2* | 7/2014 | Nagel | ................... | G06F 16/254 707/602 |
| 11,238,214 B1* | 2/2022 | George | ................... | G06F 18/24 |
| 11,853,692 B1* | 12/2023 | Gundrum | ................ | G06F 40/18 |
| 12,001,322 B2* | 6/2024 | Vaquier | ................ | G06F 11/3676 |
| 2008/0256508 A1* | 10/2008 | Jonsson | ................. | G06F 40/18 717/104 |
| 2015/0106782 A1* | 4/2015 | Tuvian | ...................... | G06F 8/76 717/104 |
| 2015/0310188 A1* | 10/2015 | Ford | ..................... | H04L 63/101 726/28 |
| 2015/0312375 A1* | 10/2015 | Valey | .................... | G06F 3/0481 709/203 |
| 2020/0042588 A1* | 2/2020 | Sagalovskiy | ........... | G06F 8/427 |
| 2020/0285694 A1* | 9/2020 | Nield | .................. | G06F 9/45504 |
| 2020/0301926 A1* | 9/2020 | Frantz | ................. | G06F 16/2308 |
| 2021/0049182 A1* | 2/2021 | Liu | ....................... | G06F 16/254 |

(Continued)

OTHER PUBLICATIONS

Gale et al., "Sigma Workbook: A Spreadsheet for Cloud Data Warehouse", Aug. 18, 2022, Proceedings of the VLDB Endowment, vol. 15, No. 12 ISSN 2150-8097, pp. 1-4 (Year: 2022).*

(Continued)

*Primary Examiner* — Jorge A Casanova (57) ABSTRACT

Executing workbook code within a cloud-based data warehouse including receiving, by a workbook manager from a client computing system, analysis code via a workbook presented on the client computing system, wherein the analysis code references data on a cloud-based data warehouse; executing, by the workbook manager, the analysis code on the cloud-based data warehouse using the referenced data to generate analysis output; and presenting, by the workbook manager, the analysis output within the workbook on the client computing system.

20 Claims, 6 Drawing Sheets

(56) References Cited

U.S. PATENT DOCUMENTS

| | | | |
|---|---|---|---|
| 2022/0027379 A1* | 1/2022 | Unterbrunner | G06F 16/254 |
| 2023/0088670 A1* | 3/2023 | Isner | G06F 8/425 |
| | | | 717/137 |
| 2023/0251958 A1* | 8/2023 | Vaquier | G06F 11/3604 |
| | | | 717/124 |
| 2023/0334237 A1* | 10/2023 | Frantz | G06F 16/26 |
| 2023/0359822 A1* | 11/2023 | Boue | G06F 40/284 |
| 2024/0070383 A1* | 2/2024 | Patel | G06F 40/18 |
| 2024/0320205 A1* | 9/2024 | Owen | G06F 16/252 |
| 2024/0320415 A1* | 9/2024 | Owen | G06F 40/169 |

OTHER PUBLICATIONS

Gale et al., "Sigma Workbook: Interactive Construction of OLAP Queries", May 1, 2021, arxiv.org, pp. 1-15 (Year: 2021).*

* cited by examiner

EXECUTING WORKBOOK CODE WITHIN A CLOUD-BASED DATA WAREHOUSE

BACKGROUND

Field of the Invention

The field of the invention is data processing, or, more specifically, methods, apparatus, and products for executing workbook code within a cloud-based data warehouse.

Description of Related Art

Modern businesses may store large amounts of data in remote databases within cloud-based data warehouses. This data may be accessed using database statement languages, such as structured query language (SQL). Manipulating the data stored in the database may require constructing complex queries beyond the abilities of most users. Further, composing and issuing database queries efficiently may also be beyond the abilities of most users.

SUMMARY

Methods, systems, and apparatus for executing workbook code within a cloud-based data warehouse including receiving, by a workbook manager from a client computing system, analysis code via a workbook presented on the client computing system, wherein the analysis code references data on a cloud-based data warehouse; executing, by the workbook manager, the analysis code on the cloud-based data warehouse using the referenced data to generate analysis output; and presenting, by the workbook manager, the analysis output within the workbook on the client computing system.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
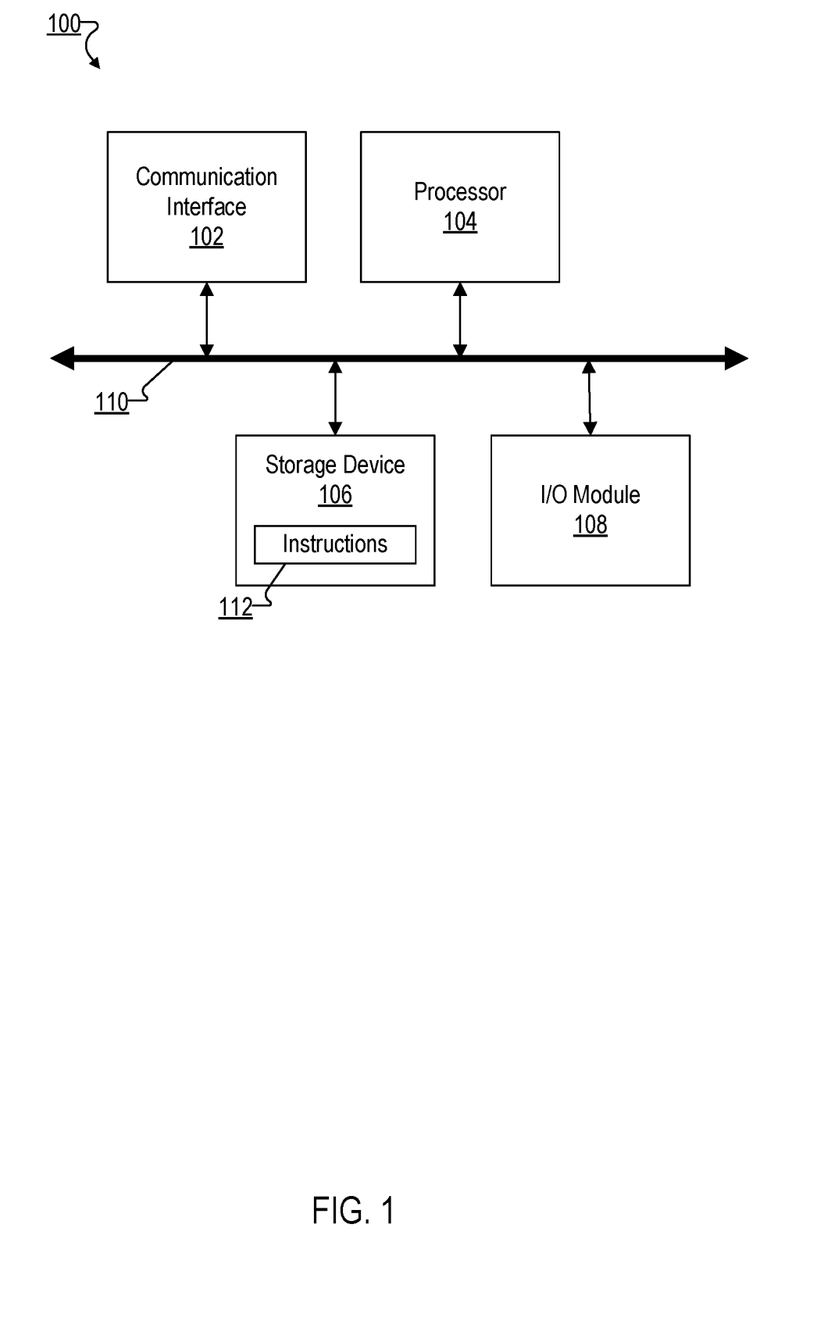
FIG. 1 sets forth a block diagram of an example system configured for executing workbook code within a cloud-based data warehouse according to embodiments of the present invention.

Example methods, apparatus, and products for executing workbook code within a cloud-based data warehouse in accordance with embodiments of the present disclosure are described with reference to the accompanying drawings, beginning with FIG. 1. FIG. 1 illustrates an exemplary computing device 100 that may be specifically configured to perform one or more of the processes described herein. As shown in FIG. 1, computing device 100 may include a communication interface 102, a processor 104, a storage device 106, and an input/output ("I/O") module 108 communicatively connected one to another via a communication infrastructure 110. While an exemplary computing device 100 is shown in FIG. 1, the components illustrated in FIG. 1 are not intended to be limiting. Additional or alternative components may be used in other embodiments. Components of computing device 100 shown in FIG. 1 will now be described in additional detail.

Communication interface 102 may be configured to communicate with one or more computing devices. Examples of communication interface 102 include, without limitation, a wired network interface (such as a network interface card), a wireless network interface (such as a wireless network interface card), a modem, an audio/video connection, and any other suitable interface.

Processor 104 generally represents any type or form of processing unit capable of processing data and/or interpreting, executing, and/or directing execution of one or more of the instructions, processes, and/or operations described herein. Processor 104 may perform operations by executing computer-executable instructions 112 (e.g., an application, software, code, and/or other executable data instance) stored in storage device 106.

Storage device 106 may include one or more data storage media, devices, or configurations and may employ any type, form, and combination of data storage media and/or device. For example, storage device 106 may include, but is not limited to, any combination of non-volatile media and/or volatile media. Electronic data, including data described herein, may be temporarily and/or permanently stored in storage device 106. For example, data representative of computer-executable instructions 112 configured to direct processor 104 to perform any of the operations described herein may be stored within storage device 106. In some examples, data may be arranged in one or more databases residing within storage device 106.

I/O module 108 may include one or more I/O modules configured to receive user input and provide user output. I/O module 108 may include any hardware, firmware, software, or combination thereof supportive of input and output capabilities. For example, I/O module 108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 108 is configured to provide graphical data to a display for presentation to a user. The graphical data may be representative of one or more graphical user interfaces and/or any other graphical content as may serve a particular implementation. In some examples, any of the systems, computing devices, and/or other components described herein may be implemented by computing device 100.

Figure 2:
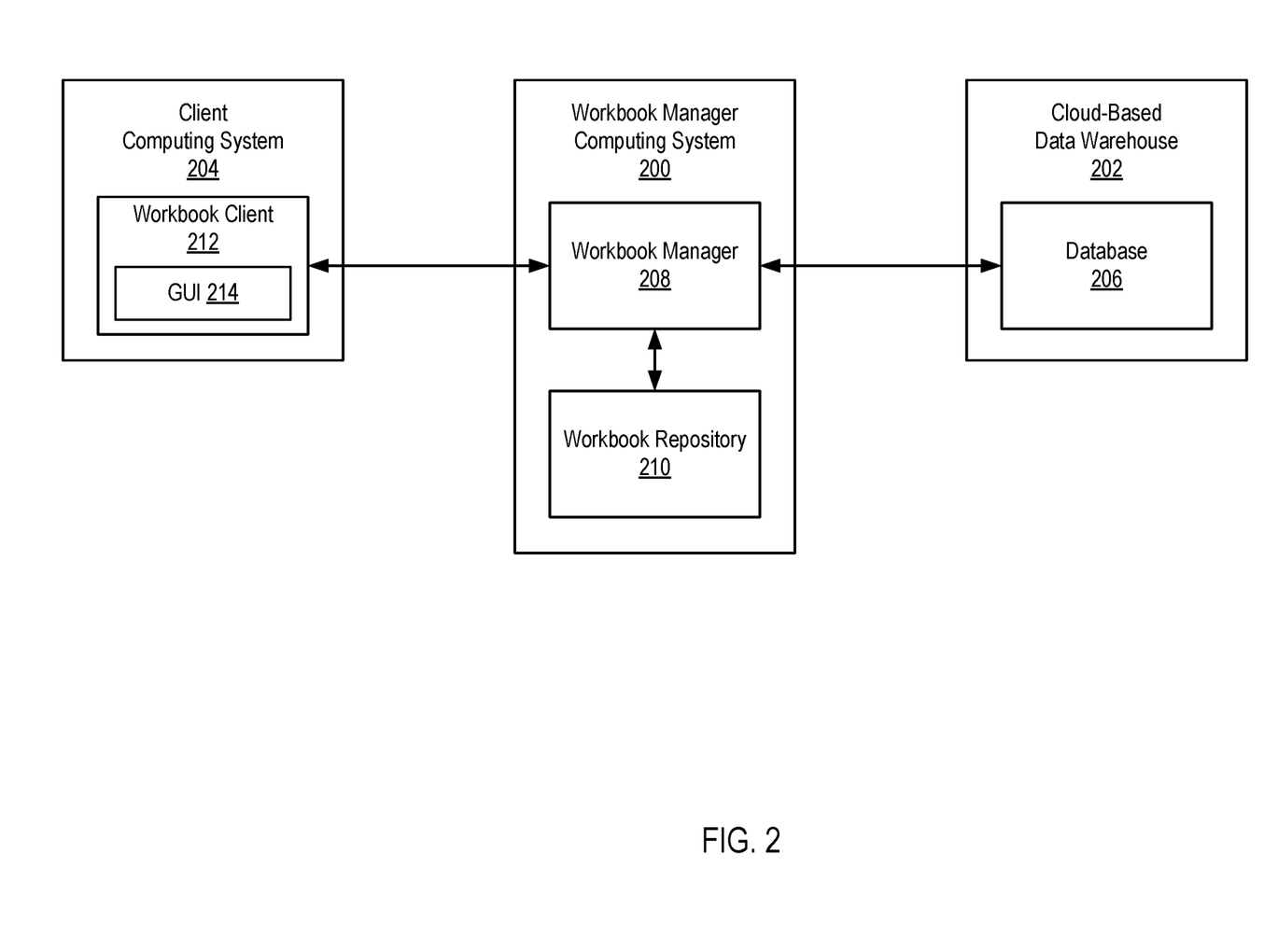
FIG. 2 sets forth a block diagram of an example system configured for executing workbook code within a cloud-based data warehouse according to embodiments of the present invention.

For further explanation, FIG. 2 illustrates a block diagram depicting an exemplary system for executing workbook code within a cloud-based data warehouse according to embodiments of the present invention. As shown in FIG. 2, the system includes a workbook manager computing system 200, a cloud-based data warehouse 202, and a client computing system 204. The workbook manager computing system 200 includes a workbook manager 208 and a workbook repository 210. The client computing system 204 includes a workbook client 212 with a graphical user interface (GUI) 214. The cloud-based data warehouse 202 includes a database 206.

The workbook manager 208 is hardware, software, or an aggregation of hardware and software configured to present a dataset within a workbook on a client computing system 204 via the workbook client 212. The workbook manager 208 uses the dataset to retrieve data from the database 206 by issuing a database statement to the cloud-based data warehouse 202 requesting the data. In response, the cloud-based data warehouse 202 sends query results including the data to the workbook manager 208. Once the query results are received, the data is then organized according to the dataset and workbook metadata to generate the workbook. The workbook is then sent to a workbook client 212 on the client computing system 204 for presentation to a client. The workbook manager 208 may reside on the workbook manager computing system 200, which is an intermediary computing system between each client computing system and the cloud-based data warehouse 202.

The cloud-based data warehouse 202 stores and manages data on behalf of a data tenant. A data tenant is an entity that controls data on the cloud-based data warehouse. The user (e.g., via the client computing system 204) accesses the data via the workbook manager 208, which organizes and analyzes the data as datasets within a workbook. The user may be within the same organization as the data tenant (e.g., an employee of the company that owns and stores the data) or may be in a business relationship with the data tenant (e.g., an employee of a company that employs the data tenant for an enterprise service). The workbook manager 208 may access the data from the cloud-based data warehouse 202 using credentials supplied by the data tenant.

A workbook is a presentation of data from a cloud-based data warehouse 202. A workbook may include one or more workbook elements. Each workbook element includes a collection of graphical elements and organizing mechanism for a dataset or portion of a dataset. Workbooks may be stored in the workbook repository 210. Workbooks are described in further detail below.

To present data from the cloud-based data warehouse 202, the data is retrieved from the database 206 (e.g., using a database statement) and organized using a dataset. A dataset is an organizing mechanism for data and resides on the workbook manager computing system 200. The dataset may also include instructions for the retrieval of data from the cloud-based data warehouse 202. The dataset may include, for example, a network location of the cloud-based data warehouse 202, a structure in which to organize the data, and formulas or other data points to be included with the data. When the workbook is being presented, the dataset also includes the data retrieved from the cloud-based data warehouse.

The workbook client 212 is a part of the workbook manager 208 and works in concert with the workbook manager 208 to present a workbook on a client computing system 204. The workbook client 212 may perform local processing of changes made to the workbook and/or the dataset. The workbook client 212 may be an application executing within a web browser. The workbook client 212 may be part of an Internet application that includes the workbook manager 208 and is hosted on the workbook manager computing system 200.

The GUI 214 is a visual presentation configured to present workbooks to a client. The GUI 214 may present a mechanism by which a user can manipulate and effect change to the workbook in the form of a workbook edit. The GUI 214 may be displayed on client computing system 204 (e.g., on a system display or mobile touchscreen).

The database 206 is a collection of data and a management system for the data. Data may be organized into columns and rows (also referred to as records). The particular columns, rows, and organization of the columns and rows that make up data may be specified in the database statement requesting the data. Data may be sent from the cloud-based data warehouse 202 in response to a database statement (also referred to as a query). Accordingly, data retrieved in response to a database statement may be referred to as query results. The database statement may be a structured query language statement.

The workbook manager 208 and workbook clients 212a, 212b may exchange information using state specifications. A state specification is a collection of data describing inputs into the GUI 214. The state specification may include manipulations of GUI elements within the GUI 214 along with data entered into the GUI 214 by a user of the client computing system 204. Such manipulations and data may indicate requests for and manipulations of data and or workbooks. Such manipulations and data may also indicate requests to edit an existing row or create a new row and values for that row. The state specification may be a standard file format used to exchange data in asynchronous browser-server communication. For example, the state specification may be a JavaScript Object Notation specification. The state specification may also include descriptions of elements that are used to apply changes to the data and/or workbooks. Such elements may include filters applied to an element of the workbook, the hierarchical level of an element of the workbook, joins performed within an element of the workbook, exposable parameters in an element of the workbook, and security for the workbook.

The workbook manager 208 may use the state specification as input to compile a database statement. This database statement generation process may include a number of intermediate forms. For example, the database statement generation process may begin with state specification being converted into an abstract syntax tree. The abstract syntax tree may then be canonicalized into a canonicalized hierarchy. The canonicalized hierarchy may then be linearized into the workbook algebra. The workbook algebra may then be lowered into a relational algebra, which may then be lowered into the database statement.

Figure 3:
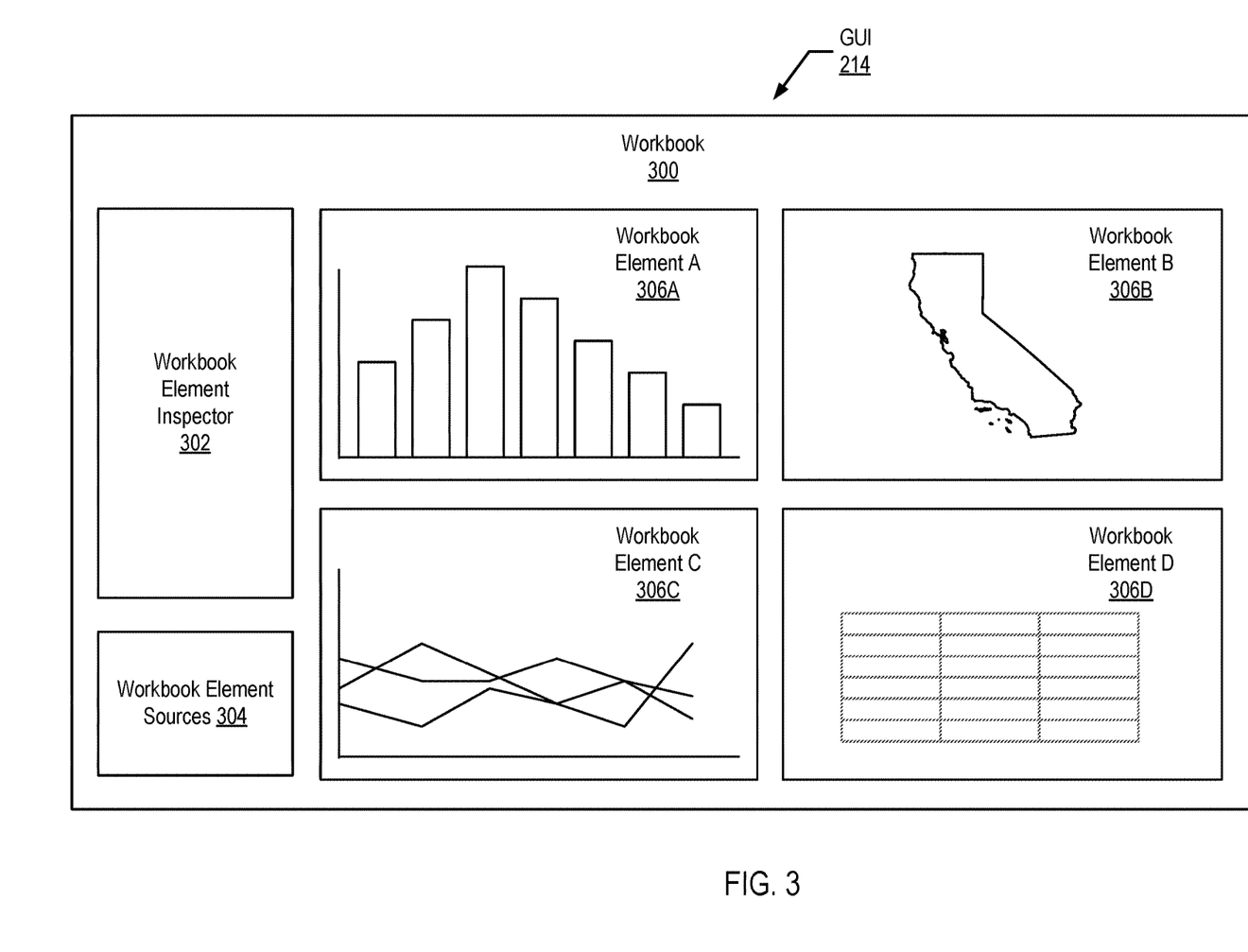
FIG. 3 sets forth a block diagram of an example system configured for executing workbook code within a cloud-based data warehouse according to embodiments of the present invention.

FIG. 3 shows an exemplary GUI for executing workbook code within a cloud-based data warehouse according to embodiments of the present invention. As shown in FIG. 3, the exemplary GUI 214 includes a workbook 300. The workbook 302 includes a workbook element inspector 302, workbook element sources 304, and four workbook elements (workbook element A 306A, workbook element B 306B, workbook element C 306C, workbook element D 306D).

The workbook 300 is a collection of graphical elements and organizing mechanism for a dataset. The workbook may present a dataset with data retrieved by the workbook manager from a cloud-based data warehouse. The dataset may then be organized based on the workbook metadata retrieved from the workbook repository. As shown in FIG. 3, the workbook 300 includes four workbook elements. Workbook element A 306A presents a bar graph, workbook element B 306B presents a map, workbook element C 306C presents a line graph, and workbook element D 306D presents a spreadsheet structure. Other types of workbook elements exist beyond the examples shown in FIG. 3. Some workbook elements (such as workbook element A 306A, workbook element B 306B, and workbook element C 306C) are visualizations. Visualizations are graphical elements that convey relationships between data in the dataset. Visualizations may include, for example, graphs, charts, or maps. Spreadsheet structures are a presentation of a dataset (such as a table) from a database on a cloud-based data warehouse. The spreadsheet structure displays rows of data organized by columns. The columns delineate different categories of the data in each row. One or more columns may be calculation columns that include calculation results using other columns in the spreadsheet structure based on a formula received from the client. Both visualizations and the spreadsheet structures may include dynamic elements and be configured to interact with a client using the client computing system 204 via the GUI 214. Each workbook element (workbook element A 306A, workbook element B 306B, workbook element C 306C, workbook element D 306D) may use a dataset unique to that workbook element or use a dataset shared by at least one other workbook element.

The workbook element inspector 302 is a mechanism by which a user may configure each workbook element. Specifically, the workbook element inspector 302 allows a user to bind dimensions of the dataset to channels of the workbook element. A dimension of the dataset refers to a group of values, rows, or columns that share a characteristic. For example, a dimension may be all values in the dataset from a particular column, all rows in the dataset that share a value for a particular column, all columns in the dataset that share a value for a particular row, etc. A channel of the workbook element 304, 306 refers to aspect of the workbook element that is assignable to a dimension. Channels of a spreadsheet structure may include columns or rows (e.g., a column of the dataset may be bound to a particular column location within the visual presentation of the spreadsheet structure). Channels of visualizations may include, for example, x-axis, y-axis, or color. For example, a column of a dataset may be bound to the x-axis of a bar chart.

The workbook element inspector 302 may include a mechanism to define and organize hierarchical relationships between the columns of a spreadsheet structure. The term "hierarchical relationship" refers to subordinate and superior groupings of columns. For example, a database may include rows for an address book, and columns for state, county, city, and street. A dataset from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The workbook element sources 304 presents the user with the primary and any secondary sources (such as datasets) for the selected workbook element. The workbook element sources 304 may also include a mechanism for a user to request and configure a dataset from a database to be presented as a workbook element in a workbook 300. Such a mechanism may be part of the interactivity of the workbook 300. Specifically, a user may manipulate a workbook (e.g., by dragging and dropping columns or rows, resorting columns or rows, manipulating a graph etc.) and, in response, the GUI 214 may generate a request (e.g., in the form of a state specification) for a dataset and send the request to the workbook manager. Such a mechanism may also include a direct identification of the rows and columns of a database table that a user would like to access (e.g., via a selection of the rows and columns in a dialog box). The GUI 214 may also include a mechanism for a user to create a new table on the database, add rows to a table, and move rows within the table.

Figure 4:
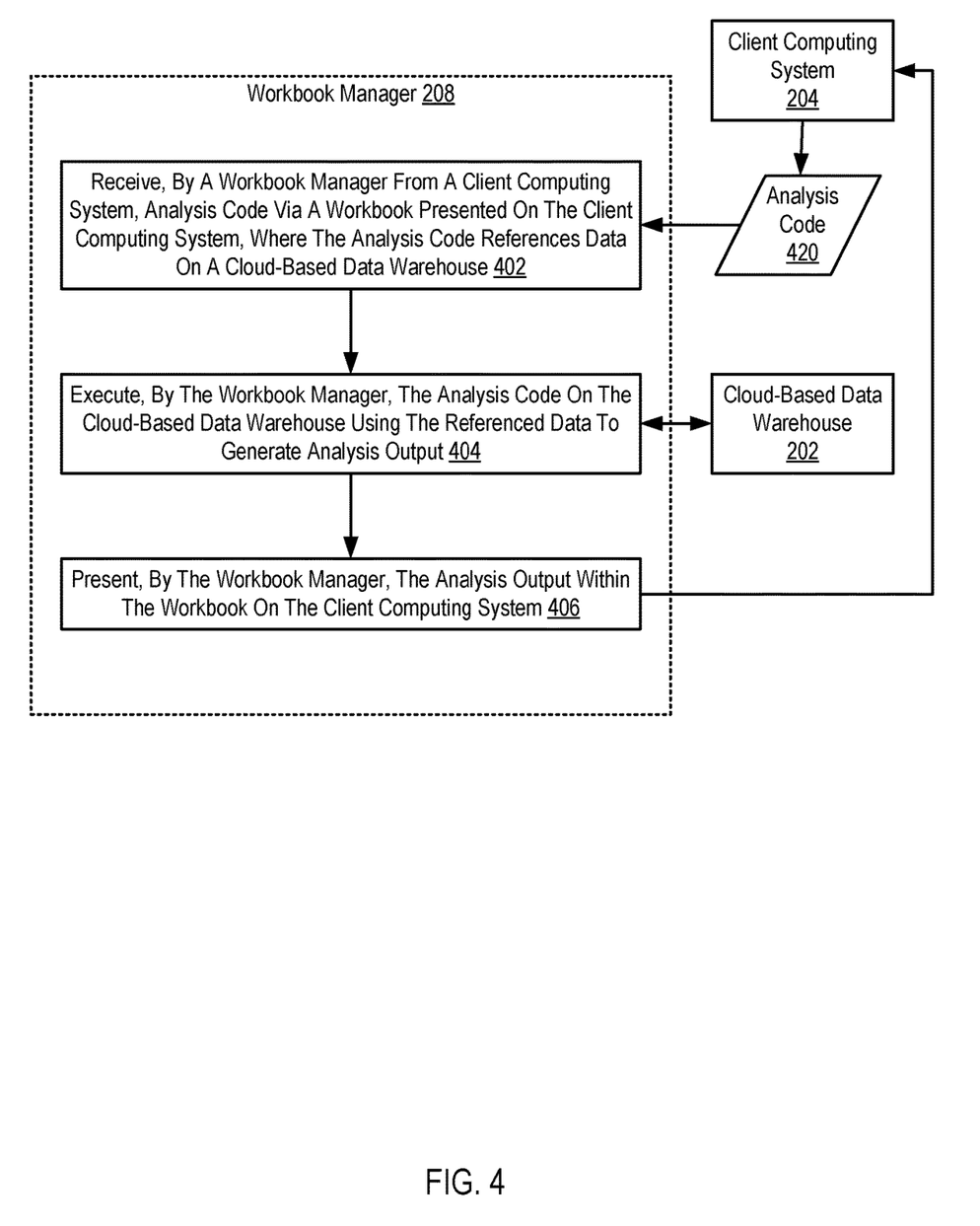
FIG. 4 sets forth a flow chart illustrating an exemplary method for executing workbook code within a cloud-based data warehouse according to embodiments of the present invention.

For further explanation, FIG. 4 sets forth a flow chart illustrating an exemplary method for executing workbook code within a cloud-based data warehouse according to embodiments of the present invention. The method of FIG. 4 includes receiving 402, by a workbook manager 208 from a client computing system 204, analysis code 420 via a workbook presented on the client computing system 204, wherein the analysis code 420 references data on a cloud-based data warehouse 202. Receiving 402 analysis code 420 via a workbook presented on the client computing system 204 may be carried out by a client user of the client computing system 204 adding the analysis code 420 to a workbook element within the workbook on the client computing system 204. The analysis code 420 may be any code that uses data from the cloud-based data warehouse 202 to derive a conclusion. The analysis code may be Python code that takes, as an input, data from the cloud-based data warehouse.

The analysis code 420 may be provided to the workbook within one or more workbook elements. The added analysis code 420 may be separated into multiple workbook elements such that a first portion of the analysis code 420 is added to a first workbook element and a second portion of the analysis code 420 is added to a second workbook element, etc. The analysis code 420 may be recombined before execution on the cloud-based data warehouse. The order of recombination may be based on the relative location of the workbook elements to each other or based on an evaluation of the portion of analysis code in each workbook element.

The referenced data may be any data on the cloud-based data warehouse 202. The referenced data on the cloud-based data warehouse may be stored within a database on the cloud-based data warehouse 202 or may be stored external to the database on the cloud-based data warehouse 202. The referenced data may have been stored on the cloud-based data warehouse 202 by the workbook manager 208 or another entity.

The analysis code 420 may also reference data within a workbook element on the workbook presented on the client computing system 204. Specifically, another workbook element may include data (e.g., derived from data in the cloud-based data warehouse or supplied by a client user) that may be used as an additional input in the analysis code 420.

For example, a client user may create an input table within a workbook element on a workbook. The input table is subsequently stored on the cloud-based data warehouse. In another workbook element, the client user may input Python code that uses, as input, data from within the input table as stored on the cloud-based data warehouse. The Python code may also use other data from within the workbook, such as an aggregation of values from the cloud-based data warehouse.

The method of FIG. 4 also includes executing 404, by the workbook manager 208, the analysis code 420 on the cloud-based data warehouse 202 using the referenced data to generate analysis output. Executing 404 (i.e., running) the analysis code 420 on the cloud-based data warehouse 202 using the referenced data to generate analysis output may be carried out by the workbook manager sending the analysis code 420 to the cloud-based data warehouse 202 and running the code using the computing resources on the cloud-based data warehouse 202. The analysis output is the resulting data generated from executing the analysis code 420 on the cloud-based data warehouse 202. The analysis output may include a value or group of values. The analysis output may include a visualization such as a graph or map. The analysis code 202 may be transferred to the cloud-based data warehouse 202 and interpreted at execution time (e.g., by the open-source Python interpreter).

The method of FIG. 4 also includes presenting 406, by the workbook manager 208, the analysis output within the workbook on the client computing system 204. Presenting 406 the analysis output within the workbook on the client computing system 204 may be carried out by the workbook manager retrieving the analysis output from the cloud-based data warehouse 202 and placing the analysis output within the GUI in a workbook element. A workbook element within the workbook may include a reference to the analysis output that is replaced with the data or values resulting from the execution of the analysis code 420.

The above steps improve the operation of the computer system by transferring the analysis code to a cloud-based data warehouse for execution instead of executing the analysis code on the workbook manager computing system where the analysis code is received from the client computing system. Executing the analysis code on the cloud-based data warehouse allows the analysis code to reference data on the cloud-based data warehouse and the analysis output to be referenced downstream by other workbook elements in the workbook. The analysis output may also be stored on the cloud-based data warehouse.

Figure 5:
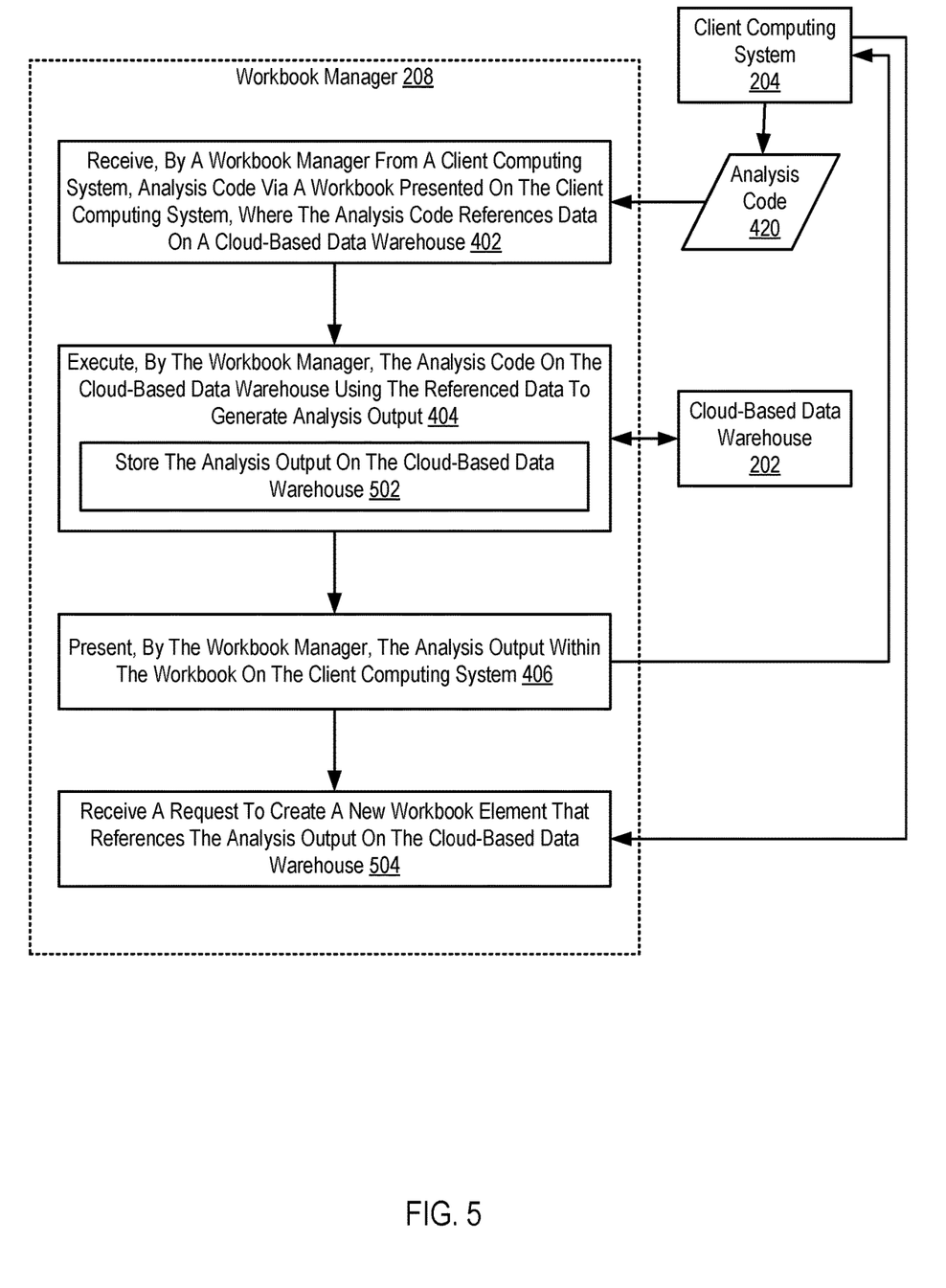
FIG. 5 sets forth a flow chart illustrating an exemplary method for executing workbook code within a cloud-based data warehouse according to embodiments of the present invention.

For further explanation, FIG. 5 sets forth a flow chart illustrating a further exemplary method for executing workbook code within a cloud-based data warehouse according to embodiments of the present invention that includes receiving 402, by a workbook manager 208 from a client computing system 204, analysis code 420 via a workbook presented on the client computing system 204, wherein the analysis code 420 references data on a cloud-based data warehouse 202; executing 404, by the workbook manager 208, the analysis code 420 on the cloud-based data warehouse 202 using the referenced data to generate analysis output; and presenting 406, by the workbook manager 208, the analysis output within the workbook on the client computing system 204.

The method of FIG. 5 differs from the method of FIG. 4, however, in that executing 404, by the workbook manager 208, the analysis code 420 on the cloud-based data warehouse 202 using the referenced data to generate analysis output includes storing 502 the analysis output on the cloud-based data warehouse 202. Storing 502 the analysis output on the cloud-based data warehouse 202 may be carried out by directing the analysis output to a storage location on the cloud-based data warehouse 202. The storage location may be within a database on the cloud-based data warehouse 202. Alternatively, the storage location may be external to the databases on the cloud-based data warehouse 202.

The analysis output may be automatically stored by the mechanism on the cloud-based data warehouse executing the analysis code. The analysis code 420 may also include an instruction to store the analysis output in a specified location within the cloud-based data warehouse 202. Alternatively, the analysis output may first be provided to the workbook manager 208. The workbook manager 208 then determines a location within the cloud-based data warehouse to store the analysis output. The location may be determined based on the client user (e.g., a storage location on the cloud-based data warehouse to which the client user has access), a team to which the client user belongs, a default location for analysis output, etc.

The method of FIG. 5 also differs from the method of FIG. 4, however, in that the method of FIG. 5 further includes receiving 504 a request to create a new workbook element that references the analysis output on the cloud-based data warehouse 202. Receiving 504 a request to create a new workbook element that references the analysis output on the cloud-based data warehouse 202 may be carried out by the workbook manager receiving selections by the client user via the GUI that indicate a new workbook element should be created (or an existing workbook element should be modified) that presents the analysis output on the workbook (e.g., via a visualization). The new workbook element that references the analysis output may include database statements, such as SQL code, or other analysis code.

Figure 6:
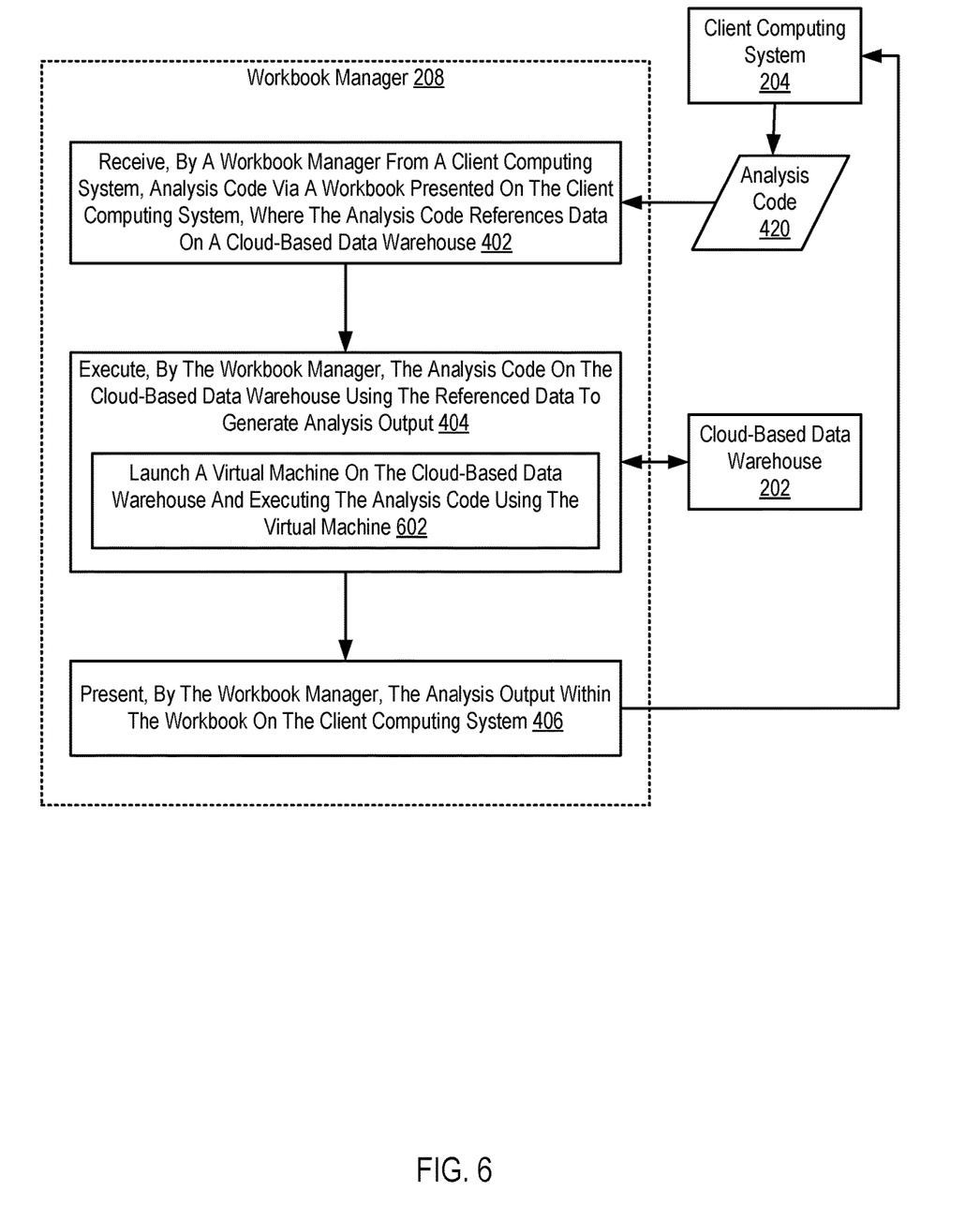
FIG. 6 sets forth a flow chart illustrating an exemplary method for executing workbook code within a cloud-based data warehouse according to embodiments of the present invention.

For further explanation, FIG. 6 sets forth a flow chart illustrating a further exemplary method for executing workbook code within a cloud-based data warehouse according to embodiments of the present invention that includes receiving 402, by a workbook manager 208 from a client computing system 204, analysis code 420 via a workbook presented on the client computing system 204, wherein the analysis code 420 references data on a cloud-based data warehouse 202; executing 404, by the workbook manager 208, the analysis code 420 on the cloud-based data warehouse 202 using the referenced data to generate analysis output; and presenting 406, by the workbook manager 208, the analysis output within the workbook on the client computing system 204.

The method of FIG. 6 differs from the method of FIG. 4, however, in that executing 404, by the workbook manager 208, the analysis code 420 on the cloud-based data warehouse 202 using the referenced data to generate analysis output includes launching 602 a virtual machine on the cloud-based data warehouse 202 and executing the analysis code 420 using the virtual machine. Launching 602 a virtual machine on the cloud-based data warehouse 202 may be carried out by the workbook manager 208 sending instructions to the cloud-based data warehouse 202 to instantiate a virtual machine capable of executing the analysis code 420. The workbook manager 208 may include, in the instructions, configuration details for the virtual machine. Executing the analysis code 420 using the virtual machine may be carried out by sending the analysis code 420 to the virtual machine on the cloud-based data warehouse 202 and running the analysis code 420 on the virtual machine.

The workbook manager 208 may initially determine whether an available virtual machine exists on the cloud-based data warehouse 202. If a virtual machine capable of executing the analysis code exists on the cloud-based data warehouse 202, then that virtual machine is targeted. If more than one capable virtual machine already exists on the cloud-based data warehouse 202, then a virtual machine may be selected based on a selection policy (e.g., the virtual machine with the most resources, the virtual machine with the best match of resources, etc.).

In view of the explanations set forth above, readers will recognize that the benefits of executing workbook code within a cloud-based data warehouse according to embodiments of the present invention include:

Improving the operation of the computer system by allowing the analysis code to reference data on the cloud-based data warehouse, increasing system utility.

Improving the operation of the computer system by allowing analysis output to be referenced downstream by other workbook elements in the workbook, increasing system utility.

Exemplary embodiments of the present invention are described largely in the context of a fully functional computer system for executing workbook code within a cloud-based data warehouse. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
   receiving, by a workbook manager from a client computing system, analysis code within a workbook element of a workbook presented on the client computing system, wherein the analysis code references data on a cloud-based data warehouse;
   executing, by the workbook manager, the analysis code on the cloud-based data warehouse using the referenced data to generate analysis output, including:
      sending, to the cloud-based data warehouse, the analysis code for interpretation using computing resources on the cloud-based data warehouse, and
      directing the analysis output to a storage location on the cloud-based data warehouse; and
   presenting, by the workbook manager, the analysis output within the workbook on the client computing system.

2. The method of claim 1, wherein executing the analysis code on the cloud-based data warehouse comprises storing the analysis output on the cloud-based data warehouse.

3. The method of claim 2, further comprising:
   receiving a request to create a new workbook element that references the analysis output on the cloud-based data warehouse.

4. The method of claim 3, wherein the new workbook element that references the analysis output includes structured query language code.

5. The method of claim 1, wherein the analysis code is Python code.

6. The method of claim 1, wherein the analysis code is interpreted on the cloud-based data warehouse.

7. The method of claim 1, wherein executing the analysis code on the cloud-based data warehouse comprises launching a virtual machine on the cloud-based data warehouse and executing the analysis code using the virtual machine.

8. The method of claim 1, wherein the referenced data on the cloud-based data warehouse is stored within a database.

9. The method of claim 1, wherein the analysis code also references data within a workbook element on the workbook presented on the client computing system.

10. The method of claim 1, wherein the workbook manager is on an intermediary computing system between the client computing system and the cloud-based data warehouse.

11. A system comprising:
    a memory; and
    a processing device, operatively coupled to the memory, the processing device configured to:
    receive, from a client computing system, analysis code within a workbook element of a workbook presented on the client computing system, wherein the analysis code references data on a cloud-based data warehouse;
    execute the analysis code on the cloud-based data warehouse using the referenced data to generate analysis output, including:
       sending, to the cloud-based data warehouse, the analysis code for interpretation using computing resources on the cloud-based data warehouse, and
       directing the analysis output to a storage location on the cloud-based data warehouse; and
    present the analysis output within the workbook on the client computing system.

12. The system of claim 11, wherein executing the analysis code on the cloud-based data warehouse comprises storing the analysis output on the cloud-based data warehouse.

13. The system of claim 12, wherein the processing device is further configured to receive a request to create a new workbook element that references the analysis output on the cloud-based data warehouse.

14. The system of claim 13, wherein the new workbook element that references the analysis output includes structured query language code.

15. The system of claim 11, wherein the analysis code is Python code.

16. The system of claim 11, wherein the analysis code is interpreted on the cloud-based data warehouse.

17. The system of claim 11, wherein executing the analysis code on the cloud-based data warehouse comprises launching a virtual machine on the cloud-based data warehouse and executing the analysis code using the virtual machine.

18. The system of claim 11, wherein the referenced data on the cloud-based data warehouse is stored within a database.

19. The system of claim 11, wherein the analysis code also references data within a workbook element on the workbook presented on the client computing system.

20. A non-transitory computer readable storage medium storing instructions which, when executed, cause a processing device to:
    receive, from a client computing system, analysis code within a workbook element of a workbook presented on the client computing system, wherein the analysis code references data on a cloud-based data warehouse;

execute the analysis code on the cloud-based data warehouse using the referenced data to generate analysis output, including:

sending, to the cloud-based data warehouse, the analysis code for interpretation using computing resources on the cloud-based data warehouse, and directing the analysis output to a storage location on the cloud-based data warehouse; and present the analysis output within the workbook on the client computing system.

* * * * *